US008580055B2

(12) United States Patent
Stuart et al.

(10) Patent No.: US 8,580,055 B2
(45) Date of Patent: Nov. 12, 2013

(54) MIXTURES AND EMULSIONS TO REDUCE ENERGY IN GYPSUM WALLBOARD MANUFACTURE

(75) Inventors: Jonathan Stuart, Lansdale, PA (US); Dennis Michael Mahoney, St. Augustine, FL (US); Ariel Lender, Schwenksville, PA (US); Norman Davies, Pottstown, PA (US)

(73) Assignee: Henry Company LLC, El Segundo, CA (US)

( * ) Notice: Subject to any disclaimer, the term of this patent is extended or adjusted under 35 U.S.C. 154(b) by 325 days.

(21) Appl. No.: 12/692,249

(22) Filed: Jan. 22, 2010

(65) Prior Publication Data

US 2010/0186870 A1  Jul. 29, 2010

Related U.S. Application Data

(60) Provisional application No. 61/147,296, filed on Jan. 26, 2009, provisional application No. 61/179,048, filed on May 18, 2009.

(51) Int. Cl.

| C04B 24/08 | (2006.01) |
|---|---|
| C04B 7/02 | (2006.01) |
| C04B 9/04 | (2006.01) |
| C04B 11/00 | (2006.01) |
| C04B 28/14 | (2006.01) |
| C04B 24/26 | (2006.01) |
| C04B 24/16 | (2006.01) |
| C04B 28/02 | (2006.01) |
| B29C 65/00 | (2006.01) |
| B32B 13/00 | (2006.01) |
| B32B 37/00 | (2006.01) |
| C08K 3/00 | (2006.01) |

(52) U.S. Cl.
USPC ............. 156/39; 106/660; 106/661; 106/772; 106/778; 524/2; 524/3; 524/4

(58) Field of Classification Search
USPC ................. 106/660, 661, 772, 778; 156/39; 524/2–4
See application file for complete search history.

(56) References Cited

U.S. PATENT DOCUMENTS

| 2,198,776 | A | 4/1940 | King et al. |
|---|---|---|---|
| 4,042,409 | A | 8/1977 | Terada et al. |
| 4,258,102 | A | 3/1981 | Traver et al. |
| 4,434,196 | A | 2/1984 | Robinson et al. |
| 4,447,498 | A | 5/1984 | Fink et al. |
| 4,748,196 | A | 5/1988 | Kuroda et al. |
| 5,120,355 | A | 6/1992 | Imai |
| 5,158,612 | A | 10/1992 | Savoly et al. |
| 5,264,028 | A | 11/1993 | Beshay |
| 5,366,810 | A | 11/1994 | Merrifield et al. |
| 5,437,722 | A | 8/1995 | Borenstein |
| 5,618,627 | A | 4/1997 | Merrifield et al. |
| 5,695,551 | A | 12/1997 | Buckingham et al. |
| 5,695,553 | A * | 12/1997 | Claret et al. ................... 106/778 |
| 5,714,001 | A | 2/1998 | Savoly et al. |
| 5,821,298 | A | 10/1998 | Reynolds et al. |
| 5,968,237 | A | 10/1999 | Sinnige |
| 6,001,286 | A | 12/1999 | Sleeter |
| 6,010,596 | A | 1/2000 | Song |
| 6,051,155 | A | 4/2000 | Hocken et al. |
| 6,106,607 | A | 8/2000 | Be et al. |
| 6,171,388 | B1 | 1/2001 | Jobbins |
| 6,323,268 | B1 | 11/2001 | Fisher et al. |
| 6,403,163 | B1 | 6/2002 | Fisher et al. |
| 6,481,171 | B2 | 11/2002 | Yu et al. |
| 6,585,820 | B2 | 7/2003 | Wantling et al. |
| 6,663,707 | B2 | 12/2003 | Wantling et al. |
| 6,811,824 | B2 | 11/2004 | Hassan et al. |
| 6,890,976 | B2 * | 5/2005 | Sinnige ............................ 524/5 |
| 6,890,982 | B2 | 5/2005 | Borsinger et al. |
| 6,902,615 | B2 | 6/2005 | Shoshany |
| 6,929,875 | B2 | 8/2005 | Savoly et al. |
| 7,033,432 | B2 | 4/2006 | Savoly et al. |
| 7,192,909 | B2 | 3/2007 | Richter et al. |
| 7,220,373 | B2 | 5/2007 | Martin et al. |
| 7,267,743 | B2 | 9/2007 | Borsinger et al. |
| 7,294,189 | B2 | 11/2007 | Wantling |
| 7,544,242 | B2 | 6/2009 | Liu et al. |
| 7,572,329 | B2 | 8/2009 | Liu et al. |
| 7,615,504 | B2 | 11/2009 | Porter et al. |

(Continued)

FOREIGN PATENT DOCUMENTS

| JP | 61-042572 A | 3/1986 |
|---|---|---|
| WO | 81/00232 A | 2/1981 |
| WO | 02/00799 A | 1/2002 |
| WO | 2008092990 A2 | 8/2008 |

OTHER PUBLICATIONS

PCT International Search Report for International Application No. PCT/US2010/021789, International Filing Date Jan. 22, 2010.
PCT International Search Report and Written Opinion, International Application No. PCT/US2010/021789, Mar. 24, 2010, 6 pages.
PCT International Preliminary Report on Patentability, International Application No. PCT/US2010/021789, Jul. 26, 2011, 5 pages.
Tomasiewicz, Ryan, Thesis The Adhesion of Paperboard to the Gypsum Core of Wallboard: An Investigation of Adhesive Bond Quality in Response to Paper Production Variables and Relative Humidity, Jun. 2003, 70 pages (see pp. 20-21).
S. Lee et al., "A New Generation of Gypsum Dispersing Agents," Global Gypsum Conference (2003), April.

(Continued)

*Primary Examiner* — Michael Orlando
(74) *Attorney, Agent, or Firm* — Flaster/Greenberg PC

(57) ABSTRACT

Provided herein are mixtures, emulsions and other additives for use in manufacturing gypsum wallboard. The mixtures and emulsions may be wax-based emulsions or wax-free mixtures or emulsions, with wax-based emulsions including water; at least one wax, a dispersant which may include sulfur or a sulfur-containing group, and a particular wetting agent or surfactant. Mixtures may also be prepared including water, a dispersant, and a particular wetting agent or surfactant. Gypsum slurries may be prepared using such emulsions and mixtures.

54 Claims, No Drawings

(56) References Cited

U.S. PATENT DOCUMENTS

| | | |
|---|---|---|
| 2002/0017222 A1 | 2/2002 | Luongo |
| 2003/0131763 A1 | 7/2003 | Wantling et al. |
| 2004/0083928 A1 | 5/2004 | Shoshany |
| 2004/0147644 A1 | 7/2004 | Sinnige |
| 2004/0157962 A1 | 8/2004 | Sinnige |
| 2005/0132926 A1 | 6/2005 | Cui et al. |
| 2006/0029785 A1 | 2/2006 | Wang et al. |
| 2006/0035112 A1 | 2/2006 | Veeramasuneni et al. |
| 2006/0196391 A1 | 9/2006 | Hassan et al. |
| 2006/0283356 A1 | 12/2006 | Donlon et al. |
| 2007/0095723 A1 | 5/2007 | Baralt et al. |
| 2007/0160766 A1 | 7/2007 | Copeland |
| 2007/0181035 A1 | 8/2007 | Wantling et al. |
| 2007/0245931 A1 | 10/2007 | Wantling |
| 2008/0003384 A1 | 1/2008 | Murphy et al. |
| 2008/0057290 A1 | 3/2008 | Guevara et al. |
| 2008/0070026 A1 | 3/2008 | Yu et al. |
| 2008/0210136 A1 | 9/2008 | Petit et al. |
| 2008/0286609 A1 | 11/2008 | Surace et al. |
| 2008/0312378 A1 | 12/2008 | Westerman |
| 2009/0025850 A1 | 1/2009 | Feigin et al. |
| 2009/0203565 A1 | 8/2009 | Dooley et al. |
| 2010/0043344 A1 | 2/2010 | Tada et al. |
| 2010/0116406 A1 | 5/2010 | Mahoney et al. |
| 2010/0152347 A1 | 6/2010 | Mahoney et al. |
| 2011/0257301 A1 | 10/2011 | Stuart et al. |

OTHER PUBLICATIONS

Search Report from Australian Counterpart Application No. 2010206717, Dated Jul. 12, 2012 (3 pages).

Translated Office Action from Chinese Counterpart Application No. 201080005644.X, July 2013.

R. Arrell et al., "Polycarboxylate Comb Copolymer Dispersants and Foaming Agents for Achieving Target Properties at Reduced Water Levels," (2005), 20 pages, May 2005.

* cited by examiner

MIXTURES AND EMULSIONS TO REDUCE ENERGY IN GYPSUM WALLBOARD MANUFACTURE

CROSS-REFERENCE TO RELATED APPLICATIONS

This application claims priority to U.S. provisional application Nos. 61/147,296, filed Jan. 26, 2009, and 61/179,048, filed May 18, 2009.

BACKGROUND OF THE INVENTION

Gypsum-based building products are commonly used in construction. A gypsum panel made of such materials can be fire retardant and can be used in the construction of walls of almost any shape. It is used primarily as an interior wall and ceiling product. Gypsum has sound-deadening properties, and is relatively easily patched or replaced if it becomes damaged. There are a variety of decorative finishes that can be applied to a gypsum panel, including paint and wallpaper. Given all of these advantages, it is still a relatively inexpensive building material.

One reason for the reasonable cost of gypsum panels is that they are manufactured by a process that is rapid and efficient. In an exemplary process, a slurry, including calcium sulfate hemihydrate and water, is used to form the core, and is continuously deposited on a paper cover sheet moving beneath a mixer. A second paper cover sheet is applied there over and the resultant assembly is formed into the shape of a panel. Calcium sulfate hemihydrate reacts with a sufficient amount of the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture. Since each of these steps takes only minutes, small changes in any of the process steps can lead to gross inefficiencies in the manufacturing process.

The amount of water added to form the slurry is in excess of that needed to complete the hydration reactions. Some of the water that is added to the gypsum slurry is used to hydrate the calcined gypsum, also known as calcium sulfate hemihydrate, to form an interlocking matrix of calcium sulfate dihydrate crystals. Excess water gives the slurry sufficient fluidity to flow out of the mixer and into the facing material to be shaped to an appropriate width and thickness. While the product is wet, it is very heavy to move and relatively fragile. The excess water is removed from the board by evaporation. If the excess water were allowed to evaporate at room temperature, it would take a great deal of space to stack and store the gypsum panel while it was allowed to air dry or to have a conveyor long enough to provide adequate drying time. Until the board is set and relatively dry, it is somewhat fragile, so it must be protected from being crushed or damaged.

In order to dry the boards in a relatively short period of time, the gypsum panel product is usually dried by evaporating the extra water at elevated temperatures, for example, in an oven or kiln. It is relatively expensive to build and operate the kiln at elevated temperatures, particularly when the cost of fossil fuel rises. A reduction in production costs could be realized by reducing the amount of excess water present in set gypsum boards that is later removed by evaporation. In particular, methods of preparing gypsum wallboard which help to provide a reduced slurry viscosity and thus a reduced water content would enable a reduction in drying time and/or heat, and thus a reduction in the use of energy in manufacture.

Accordingly, there is a need in the art for compositions and methods which reduce energy costs associated with the manufacture of gypsum formulations, as well as a way to maintain and/or reduce energy costs associated with the manufacture of water-resistant gypsum formulations, while maintaining desirable formulation properties.

SUMMARY OF THE INVENTION

The present invention relates to additives to improve stucco rheology, resulting in less energy demand for gypsum-based building products, such as gypsum wallboards.

In one embodiment of the present invention, an additive comprising a blend of one or more wetting agents, surfactants and/or dispersants can be used as part of a wax emulsion or independently as a standalone additive to modify the stucco slurry rheology in gypsum construction product manufacture, in order to improve the energy demands of the gypsum construction product manufacturing process. In that wax emulsion, the at least one wax may comprise, but is not limited to, one or more of montan wax, paraffin wax, carnauba wax, a Fischer-Tropsch wax, and derivatives and blends thereof. The wax emulsion can include a paraffinic hydrocarbon, which may be a paraffin wax. The wax emulsion can also include at least one stabilizer, such as polyvinyl alcohol, which may be a hydrolyzed polyvinyl alcohol. Optionally, the wax emulsion can also include saponifying agents such as alkali metal hydroxides. One example of such alkali metal hydroxides is potassium hydroxide. The dispersant can be one which contains sulfur or a sulfur-containing group such as lignosulfonic acid, naphthalene sulfonic acid, and combinations and salts thereof.

In another embodiment, mixtures may be made to be wax-free or modified to form an emulsion. The wax-free mixture comprises water; one or more dispersants; and one or more wetting agents, and/or surfactant. Dispersants in this embodiment may be ones which contain sulfur or a sulfur-containing group such as lignosulfonic acid, naphthalene sulfonic acid, and combinations and salts thereof.

In one embodiment, the non-wax or independent additive comprises about 10 percent to about 50 percent by weight of water; about 1 percent to about 30 percent by weight of one or more wetting agents or surfactants; and about 20 percent to about 75 percent by weight of one or more of a dispersant, wherein the dispersant may be lignosulfonic acid, naphthalene sulfonic acid, and combinations and salts thereof.

In a further embodiment, the non-wax or independent additive comprises about 15 percent to about 30 percent by weight of water; about 5 percent to about 15 percent by weight of one or more wetting agents or surfactants; and about 50 percent to about 75 percent by weight of one or more dispersants, wherein the dispersant may be lignosulfonic acid, naphthalene sulfonic acid, and combinations and salts thereof. Adjustments to pH can be made with alkali metal hydroxides if needed.

In one embodiment, the wax emulsion noted above comprises about 35 percent to about 80 percent by weight of water; about 15 percent to about 60 percent by weight of a blend of paraffinic hydrocarbon and the at least one wax; about 1.0 percent to about 5.0 percent by weight of the dispersant, wherein the dispersant may be lignosulfonic acid, naphthalene sulfonic acid, and combinations and salts thereof; about 0.1 percent to about 10 percent by weight of one or more wetting agents or surfactants; and about 0 percent to about 5 percent by weight of at least one stabilizer.

In a further embodiment, the wax emulsion comprises about 50 percent to about 65 percent by weight of water; about 20 percent to about 40 percent by weight of the blend of paraffinic hydrocarbon and at least one wax; about 2.0 percent to about 4.0 percent by weight of the dispersant; about 0.25 percent to about 2.5 percent by weight of one or more wetting agents or surfactants; and about 0 to about 10 percent by weight of the at least one stabilizer.

The wetting agents and/or surfactants can be chosen from materials including: fatty alcohols, ethoxylated alcohols, vegetable oil ethoxylates, alkyl phenol ethoxylates, monobasic esters, silicone polyethers, alkylated pyrrolidones, asphaltene dispersants, acetylenic diols, EO/PO block copolymers, polyethylene glycols, polyethylene glycol (PEG) esters, alkylbenzenesulfonic acids, alkylbenzene sulfonate, sodium, potassium and amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants. The wetting agents and/or surfactants can be used independently or in blends of more than one material. It has been found that anionic wetting agents and surfactants did not provide favorable results, likely due to the nature of the hard water and other ions present in the gypsum wallboard system, and also because anionic surfactants tend to generate excessive foam. Wetting agents and/or surfactants are needed that are foam neutral. Some foaming is necessary but excessive foam can lead to inferior wallboard characteristics.

The silicone polyether compound additive in the above embodiments may be one of the following (commercially available from Siltech Corporation): silicone polyethers (Silsurf™ products); phosphated silicone polyether ethers (Silphos™ products); silicone polyether quaternary compounds (Silquat™ products); silicone polyether alkyl polyethers (Silube™ products); silicone defoamers (Siltech™ products); fluorinated silicones (Fluorosil™ products); or silicone prepolymers (Silmer™ products). In addition, the additive may be one of the following (commercially available from Momentive Performance Materials): silicone copolymer/polyalkylene oxide blends or polyalkyleneoxide modified polydimethylsiloxanes (Silwet™ products, including Hydrostable™ products). The additive may also be an alternative modified polysiloxane (Silbyk™ products, commercially available from Byk Additives and Instruments).

The pyrrolidone-based compound additive in the above embodiments may be a 1-octyl-2-pyrrolidone (Surfadone™ LP100, commercially available from International Specialty Products (ISP)) or 1-dodecyl-2-pyrrolidone (Surfadone LP300, commercially available from ISP); other examples are found in U.S. Pat. No. 7,264,885, incorporated by reference herein.

The ethoxylated alcohol compound additive in the above embodiments may be chosen from a range of either EO content and/or alkyl chain length. The alcohol component can range from C8 to C18 and the EO content can range from 1 mole to 50 moles. Selections such as a one-mol EO C12-13 alcohol (such as Tomadol™ 23-1, commercially available from Air Products and Chemicals, Inc.) or a thirteen-mol EO C14-15 alcohol (such as Tomadol 45-13, commercially available from Air Products and Chemicals, Inc.) provide interesting results. It should be noted that the former has a hydrophile-lipophile balance (HLB) value of 3.7 and the later has a HLB value of 14.4. The gypsum wallboard systems do not follow traditional wetting agent and/or surfactant guidelines of using HLB values to determine system viability. In fact, surfactants with HLB values ranging from about 3 to 16 can be used in combination with the dispersant and stabilizer.

Powerful wetting agents such as acetylenic diols (such as Surfynol™ 104, commercially available from Air Products and Chemicals, Inc.) are also useful, however these are also powerful defoamers. Defoaming agents can cause severe issues in the gypsum wallboard manufacturing process by coalescing the intentional air bubbles created in the wallboard to reduce weight. When these air bubbles are coalesced, they can form blisters on the surface of the wallboard during manufacture or even cause the paper or other scrim to debond from the gypsum core.

The present invention also includes a settable gypsum composition suitable for forming a gypsum product. The settable gypsum composition comprises: a) a gypsum slurry and b) an additive comprising a blend of one or more wetting agents and/or surfactants, wherein a ratio of the wetting agent/surfactant blend to gypsum in the gypsum slurry is about 0.001:100 to about 10.0:100 by weight. The settable gypsum composition may further comprise a dispersant.

In another embodiment, the settable gypsum composition comprises: a) a gypsum slurry and b) a mixture comprising water, a dispersant, and an additive comprising a blend of one or more wetting agents and/or surfactants, wherein a ratio of the wetting agent/surfactant blend to gypsum in the gypsum slurry is about 0.001:100 to about 10.0:100 by weight. The mixture for the settable gypsum composition can be a wax emulsion comprising at least one wax, a dispersant and an additive comprising a blend of one or more wetting agents and/or surfactants provided in the ratios mentioned above. The gypsum product formed with the settable gypsum composition that includes the wax emulsion is water-resistant.

The present invention also includes an improved method for making gypsum wallboards. The method comprises preparing a gypsum slurry, and adding a mixture to the gypsum slurry comprising water, a dispersant, and an additive comprising a blend of one or more wetting agents and/or surfactants, whereby the viscosity of the gypsum slurry is lowered to a desired level that minimizes the use of water to control the viscosity, using the gypsum slurry to form a structure and drying the structure to form a gypsum wallboard. In other words, the addition of the mixture in the gypsum slurry results in a gypsum slurry that has the same viscosity with lower water content, when compared to the conventional gypsum slurry formulation. Thus, the interim structures formed with such gypsum slurry will have lower water content, and thus less water to be removed during the subsequent drying process to form the final gypsum-based product. In another embodiment, the mixture added to the gypsum slurry can be a wax emulsion comprising at least one wax, water, a dispersant, a blend of one or more wetting agents and/or surfactants, and the resulting gypsum wallboard is water-resistant.

A further improvement includes a method of making gypsum wallboard, wherein the method comprises preparing a gypsum slurry, using the gypsum slurry to form a structure and drying the structure to form a gypsum wallboard, and providing to the gypsum slurry an additive comprising the wetting agents and/or surfactants noted above. In one embodiment, this improvement further comprises providing a dispersant to the slurry.

The provision of the additive comprising a blend of one or more wetting agents and/or surfactants according to the present invention results in an improved manufacturing process for gypsum-based building products. The additive acts as a surfactant for the gypsum crystals in the gypsum slurry and lowers the water content of the gypsum slurry, while maintaining the desired viscosity conventionally achieved with higher water content in the gypsum slurry. This reduces the amount of water which needs to be removed during the subsequent drying process in forming the final gypsum-based building product, and thus reduces the amount of energy required during the manufacturing process. This translates into cost savings for the manufacturer of the building products.

Thus, the provision of the additive provides an improved, more energy efficient manufacturing method for the manufacture of gypsum-based building products, such as gypsum wallboards.

DETAILED DESCRIPTION OF THE INVENTION

Described herein are various wax emulsions and mixtures which may be made to be wax-free or modified to form wax emulsions, methods for using such emulsions and mixtures, building product formulations including such emulsions and mixtures, improvements to the manufacture of such products using such emulsions and mixtures, gypsum slurry compositions and methods using such compositions. The emulsions, mixtures and compositions described herein are able to reduce energy costs and provide manufacturing cost savings by providing improved gypsum slurry viscosity, which reduces water content in the gypsum slurry generally so that the amount of heat required during the drying process is reduced. In addition, for water-resistant building products using the wax emulsions and mixtures described herein, the emulsions and mixtures are able to provide equivalent percentage water absorption while allowing for energy reduction in the manufacture of such building products by reducing drying times and/or by reducing heat.

The present invention includes both a wax emulsion for use in manufacturing gypsum-based building products that can provide water-resistance to gypsum-based building products, and a mixture which may optionally be modified to be emulsions, such that waxes and other wax-related additives are optional for such mixtures. In either case, the use of the wax emulsion and the mixture lowers the water content of the gypsum slurry while maintaining the desired viscosity, thus resulting in a more energy efficient manufacturing process.

As used herein, an "emulsion" means an emulsified formulation of components, preferably including at least one wax. A "mixture," as that term is used herein, includes any combination of components in a formulation, whether in solution, dispersion, suspension or other liquefied form of combined ingredients. Mixtures herein may be modified with emulsification components and made into emulsions.

In a wax-based emulsion, according to a preferred embodiment, is an aqueous emulsion which includes water, at least one wax, a dispersant, and a blend of one or more wetting agents and/or surfactants. The water for use in the emulsion may be any water suitable for forming wax emulsions for building products, and can be standard tap water, distilled water, or the like. Generally, the water content of the aqueous emulsion suitable for gypsum-based building products such as gypsum wall boards is about 35% to about 80%, preferably about 50% to about 65%, by weight, of the emulsion. For any given application, however, the water content may vary depending on the desired end properties.

The wax-based emulsions preferably include a paraffinic hydrocarbon, which is most preferably a paraffin wax. Such a paraffin wax may be any suitable paraffin-based wax that functions compatibly with other waxes and components in the resulting wax emulsion, and further preferably has a melting point of about 40° C. to about 80° C., which properties are favorable for water-resistant wallboard manufacture. Other paraffinic hydrocarbons or paraffinic waxes may be used as well.

As defined herein, the at least one wax may include paraffin wax as well as other waxes known in the art, or to be developed for use in water-resistant wallboard and various wax substitute components used in such a gypsum wallboard formulation. That is, one skilled in the art would understand that the at least one wax component may include materials that substitute functionally for or otherwise satisfy the function of the wax material in the wax emulsions. Some examples of such substitute materials are synthetic polymers, fatty acid derivatives and the like that are modified to perform as waxes in such a formulation, specific siloxanes (e.g., polymethylhydrosiloxane (PMHS)), any other wax substitute known or to be developed in the art, and derivatives and combinations of such materials.

Examples of waxes which may be used herein include natural montan wax, bleached or refined montan wax, carnauba wax, beeswax, scale wax, slack wax, petroleum waxes, polyethylene wax, soybean wax, corn wax, cottonseed wax, rapeseed wax, canola wax, sunflower wax, palm wax, palm kernel wax, coconut wax, cranberry wax, linseed wax and peanut wax. Other waxes which may be used include synthetic waxes, such as Fischer-Tropsch wax and mixtures of synthetic wax acids and synthetic wax esters. It should also be understood that derivatized versions of such waxes, to include various COOH or OH groups for performance, oxidized waxes, or combinations of such waxes (whether by blend or by polymerized functionalizing of the base polymer, as in a modified Fischer-Tropsch wax) can also be used. In one preferred embodiment, blends of saponifiable and non-saponifiable waxes, such as blends of paraffin wax with montan, carnauba and/or Fischer-Tropsch waxes are used.

It should be understood that while certain waxes as described herein are preferred, such as montan, carnauba and Fischer-Tropsch waxes, if the benefits of the additives herein are otherwise achieved within a wax-substituted product or other wax combination useful for water-resistant wallboard, the wax combination is contemplated as being within the scope of the invention herein, and the wax selections should not be seen as limiting the scope of the invention. For example, siloxanes (with and without catalytic or other additives) are known for use as water-resistant wax formulation substitutes for preparing water-resistant gypsum wallboard as described in U.S. Patent Publication No. 2006-0035112-A1, incorporated herein in relevant part with respect to the use of various siloxane formulations in preparing gypsum wallboard.

The at least one wax in the wax emulsion should preferably make up about 15 percent to about 60 weight percent of the wax emulsion, and more preferably about 20 percent to about 40 percent by weight. If a blend of a paraffinic hydrocarbon, such as a paraffin wax and another wax or waxes is used, it is preferred that the blend include about 99:1 to about 1:99 paraffin to the other wax(es) in the blend, more preferably about 80:20 to about 20:80, still more preferably about 70:30 to about 30:70, and most preferably 60:40 to 40:60. Further, the wax(es) (including substitutes) are most preferably included in such an emulsion in a total amount of about 1 part to about 200 parts, preferably about 1 part to about 50 parts, by weight, per 100 parts of the paraffinic hydrocarbon. Most preferred blends in the above-noted compositional ranges include paraffin wax and montan wax.

The wax emulsion can also include at least one stabilizer. The stabilizer(s) may be any stabilizer known to be used or to be developed for such use in water-resistant wax emulsion formulations. A preferred stabilizer herein is polyvinyl alcohol; preferably one that is prepared by hydrolysis of polyvinyl acetate and that is preferably a substantially completely or fully hydrolyzed polyvinyl alcohol. Most preferably it is at least about 90% hydrolyzed polyvinyl alcohol, and more preferably 97-98 to 100% hydrolyzed polyvinyl alcohol. Such polyvinyl alcohols are preferably used so as to be soluble in water at elevated temperatures of about 60° C. to about 95° C., but are insoluble in cold water. Stabilizer(s) are optional and, if used, can comprise from 0 up to about 30 percent by weight of the wax emulsion and preferably make up about 1 percent to about 30 percent by weight of the wax emulsion. In other embodiments, the stabilizers may be present in an amount of about 0 percent to about 20 percent by weight of the wax-based emulsion, more preferably about 0 to about 10 percent by weight and most preferably about 0.01 percent to about 8 percent by weight thereof. If polyvinyl alcohol is used as the stabilizer in combination with a wax blend based on a paraffin wax, it may be present in an amount of about 0 to about 50 parts, preferably about 1 part to about 20 parts, by weight, per 100 parts of the paraffinic wax. The polyvinyl alcohol can provide adhesive characteristics, as well as enhancing the water resistance.

In other embodiments, saponifiers or saponifying agents also can be used in the wax emulsions herein. Suitable saponifiers include any of a variety of alkali metal hydroxides and similar materials such as potassium hydroxide, ammonium hydroxide, sodium hydroxide, magnesium sulfate and the like. Saponifiers may be present in an amount of no greater than about 5 weight percent of the emulsion, preferably no greater than about 2 weight percent and most preferably about 0.01 weight percent to about 1 weight percent.

Dispersants are also used in the wax emulsion or the mixture formulations and are preferred for use in combination with a blend of one or more wetting agents and/or surfactant additives herein. Preferred dispersants include, but are not limited to those having a sulfur or a sulfur-containing group(s) in the compound such as sulfonic acids (R—S(=O)$_2$—OH) and their salts, wherein the R groups may be otherwise functionalized with hydroxyl, carboxyl or other useful bonding groups. Preferred are higher molecular weight sulfonic acid compounds such as lignosulfonic acid, naphthalene sulfonic acid, the sulfonate salts of these acids and derivatized or functionalized versions of these materials. In addition, other dispersants known in the art for use in wax emulsions, such as magnesium sulfate; ammonium hepta molybdate/starch combinations; non-ionic surfactants, anionic surfactants, zwitterionic surfactants and mixtures thereof; and alkyl quaternary ammonium montmorillonite clay as well as other known dispersants may be used. Dispersants are preferably present in an amount of about 1.0 percent by weight to about 5.0 percent by weight of the wax emulsion, and preferably about 2.0 percent to about 4.0 percent by weight of the wax emulsion.

The silicone polyether compound additive in the above embodiments may be one of the following (commercially available from Siltech Corporation): silicone polyethers (Silsurf™ products); phosphated silicone polyether ethers (Silphos™ products); silicone polyether quaternary compounds (Silquat™ products); silicone polyether alkyl polyethers (Silube™ products); silicone defoamers (Siltech™ products); fluorinated silicones (Fluorosil™ products); or silicone prepolymers (Silmer™ products).

In addition, the additive may be one of the following (commercially available from Momentive Performance Materials): silicone copolymer/polyalkylene oxide blends or polyalkyleneoxide modified polydimethylsiloxanes (Silwet™ products, including Hydrostable™ products). The additive may also be an alternative modified polysiloxane (Silbyk™ products, commercially available from Byk Additives and Instruments).

The pyrrolidone-based compound additive in the above embodiments may be a 1-octyl-2-pyrrolidone (Surfadone™ LP100, commercially available from International Specialty Products (ISP)) or 1-dodecyl-2-pyrrolidone (Surfadone LP300, commercially available from ISP); other examples are found in U.S. Pat. No. 7,264,885, incorporated by reference herein.

The ethoxylated alcohol compound additive in the above embodiments may be chosen from a range of either EO content and/or alkyl chain length. Selections such as a one-mol EO C12-13 alcohol (such as Tomadol™ 23-1, commercially available from Air Products and Chemicals, Inc.) or a thirteen-mol EO C14-15 alcohol (such as Tomadol 45-13, commercially available from Air Products and Chemicals, Inc.) provide interesting results. It should be noted that the former has an HLB value of 3.7 and the latter has an HLB value of 14.4. The gypsum wallboard systems do not follow traditional wetting agent guidelines of using HLB values to determine system viability.

Powerful wetting agents such as acetylenic diols (such as Surfynol™ 104, commercially available from Air Products and Chemicals, Inc.) are also useful, however these are also powerful defoamers. Defoaming agents can cause severe issues in the gypsum wallboard manufacturing process by coalescing the intentional air bubbles created in the wallboard to reduce weight. When these air bubbles are coalesced, they can form blisters on the surface of the wallboard during manufacturer or even cause the paper or other scrim to debond from the gypsum core.

The blend of one or more wetting agents and/or surfactants preferably is present in the formulation in an amount of about 0.1 weight percent to about 10 weight percent or more of the formulation, and more preferably about 0.25 percent by weight to about 2.5 percent by weight of the wax emulsion formulation.

In one method of manufacture of an aqueous wax emulsion herein, the wax or waxes are each heated to a molten state, and if more than one wax is present, the waxes are then blended together. A hot aqueous solution of the other components, such as stabilizers, for example, polyvinyl alcohol, optional saponifiers, the dispersant(s), the additive and any other components used in the emulsion may then be passed with the hot blend of the waxes through a colloid mill and the resulting emulsion allowed to cool.

Alternatively, a homogenizer may be used instead of a colloid mill. Such homogenizers may be the same general type of equipment used to homogenize milk and other products. In such a method, a mixture of the wax component and the emulsifying components are fed under high pressure (typically about 1500 psi to about 3500 psi) to emulsify the wax(es) and create a smaller particle size than is typically associated with use of a colloid mill. It will be understood to one skilled in the art based upon this disclosure that other manufacturing methods and types of equipment and procedures for preparing the emulsion can be used, as are known or which may be developed in the art. The emulsion of the invention may also readily be reformed by agitation, in the event that emulsified components of the emulsion separate on storage.

Also within the scope of the invention as previously noted are mixtures, in which the at least one wax as defined herein is optional. Such mixtures can be prepared to be "wax-free," but can optionally be modified and prepared and provided with wax-based materials (or wax substitutes or other water-resistant gypsum additives such as siloxanes as described elsewhere herein) such as to be formed into emulsions. Such mixtures include water, dispersant(s) and at least one of the wetting agents and/or surfactants described hereinabove. Optionally, such mixtures also include one or more stabilizer(s). The water component, dispersant(s), wetting agents and/or surfactants, as well as any stabilizer(s) are the same materials noted above for use in the wax-based emulsions. Optional saponifiers, such as those mentioned hereinabove, may also be used, however, if the mixture is wax-free, such saponifiers would not necessarily function to saponify, but may be useful for adjustment of pH of the mixture.

In one preferred embodiment, such a mixture is prepared including about 10 percent by weight to about 80 percent by weight, more preferably about 15 percent to about 40 percent by weight water; about 5 percent by weight to about 80 percent by weight, more preferably about 40 percent by weight to about 70 percent by weight of dispersant(s) (preferably a lignosulfonic acid or naphthalene sulfonic acid, or salt thereof, combinations of these materials or other known dispersants); about 1.0 percent by weight to about 25 percent by weight or more, more preferably 5.0 percent by weight to about 15.0 percent by weight of a blend of one or more wetting agents and/or surfactants, and optionally about 0 to about 30 percent, more preferably about 0 percent by weight to about 20 percent by weight, most preferably about 0 percent by weight to about 10 percent by weight of a stabilizer(s) (preferably polyvinyl alcohol as described herein). Optionally, other components such as the saponifier(s), pH adjustment additives or various other additives (including waxes) may be added to modify the mixture.

The mixtures in this embodiment, if prepared to be wax-free, may be made by simply combining the components as in the second step of preparing the non-wax phase of the wax-based emulsion using, for example, a colloid mill, homogenizer or a similar mixing mechanism or other method known by those in the art to mix the components.

The present invention also includes settable gypsum formulations which may include any of the wax emulsions or mixtures noted hereinabove or prepared directly using various components of such mixtures as described below. In preparing a gypsum wallboard using the wax emulsions, mixtures and components herein, an aqueous slurry of the gypsum material is prepared in any suitable manner known in the art or to be developed. In an embodiment of the invention, an aqueous wax emulsion or mixture according to the invention is then added to the slurry and mixed with the slurry in proportions to provide about 0.5 part to about 20 parts by weight of solids per 100 parts of gypsum. Alternatively, a gypsum slurry may be formed and a blend of one or more wetting agents and/or surfactants used to modify the stucco slurry viscosity are provided directly to the gypsum slurry without first being mixed with other components. Preferably a dispersant such as those described herein is also added. The amount of dispersant may vary but preferably has a ratio with respect to a blend of one or more wetting agents and/or surfactants used to modify the stucco slurry viscosity to that which is used and described herein if these components are first used in an aqueous mixture and then added.

The base gypsum compositions may be varied in accordance with conventional gypsum formulation requirements in the art of gypsum manufacture. Other ingredients such as foaming agents, other dispersants and set accelerators may be included in the slurry. In addition, it is noted that in preferred embodiments of settable gypsum slurry formulations using the mixtures or emulsions described herein, or direct addition of a blend of one or more wetting agents and/or surfactants, a ratio of about 0.001:100 to about 10.0:100, more preferably about 0.01:100 to about 2.0:100, and most preferred about 0.1:100 to about 1.0:100 by weight, preferably exists between a blend of one or more wetting agents and/or surfactants and the gypsum in the slurry. While this is not required, it contributes to preferred slurry viscosity properties.

In preparing wallboards from such a settable gypsum formulation, the mixture of gypsum slurry and the mixtures, wax emulsions and a blend of one or more wetting agents and/or surfactants or other compounds described herein can be applied to a first sheet of wallboard liner to form a layer of the gypsum mixture thereon. A second sheet of liner is then disposed on top of the deposited layer to form a wallboard assembly or structure in which the first and second sheets are in opposed, facing relationship and have the layer of the gypsum mixture there between.

Alternatively, the gypsum slurry may be prepared directly into a liner-less wallboard structure using manufacturing methods involving press-in-place molding and similar techniques, such that reference to gypsum wallboard herein is not restricted to liner-covered wallboard. However, it should be understood that any manufacturing technique for making wallboard including a settable gypsum formulation is within the scope of the invention described herein, such as for example, wallboard manufactured with glass mats on the exterior surfaces instead of standard liners.

The resulting structure or assembly may then be dried, such as by oven drying to remove excess water not needed for hydration of the gypsum, to leave finished gypsum wallboard. If liners are used, they may be formed of paper or may comprise fiberglass or organic fiber mats as well. Use of the emulsions and mixtures of the invention and/or providing the wetting agents and/or surfactant additives herein to a slurry help to reduce drying time and/or heat, thereby contributing to energy savings in the manufacture of such gypsum wallboards. In forming water-resistant gypsum wallboard, wax-based emulsions herein are preferably used, and for standard wallboard, either the wax-free mixtures or wax-based emulsions may be used.

The invention provides an improvement to prior methods of preparing gypsum wallboard, in that the emulsions and mixtures herein, when prepared and added to the gypsum slurry, or when directly providing to the gypsum slurry a blend of one or more wetting agents and/or surfactants (preferably with a dispersant), help to provide a reduced slurry viscosity and thus reduced water content, and enable a reduction in drying time and/or heat and thus a reduction in the use of energy in manufacture. This method is also an improvement when using wax-based formulations herein in water-resistant gypsum wallboard. Thus, the invention further includes a method to reduce energy use in the manufacture of building products, such as gypsum wallboard, by providing to the formulations used for forming such building products, prior to any drying step(s) in the manufacturing process of these building products, an emulsion or mixture according to the invention as described herein, or the direct addition of one or more wetting agents and/or surfactants, with a preferred dispersant. If a water-resistant gypsum wallboard is being formed, a wax-based emulsion as described herein is preferably used.

The invention will now be described with respect to the following non-limiting examples, below.

Surfactant Formulations

| Example | Surfactant 1 | Wt % | Surfactant 2 | Wt % | Patty Size (cm) |
|---|---|---|---|---|---|
| 1 | Ethal™ EH-2 | 15 | | | 28.0 |
| 2 | Ethal EH-5 | 15 | | | 27.2 |
| 3 | Ethal DA-4 | 15 | | | 23.5 |
| 4 | Ethal DA-6 | 15 | | | 21.5 |
| 5 | Tomadol™ 91-2.5 | 15 | | | 24.0 |
| 6 | Tomadol 91-6 | 15 | | | 22.5 |
| 7 | Tomadol 91-8 | 15 | | | 23.0 |
| 8 | Tomadol 1-3 | 15 | | | 27.0 |
| 9 | Tomadol 1-5 | 15 | | | 26.5 |
| 10 | Tomadol 1-7 | 15 | | | 27.0 |
| 11 | Tomadol 1-9 | 15 | | | 25.0 |
| 12 | Tomadol 23-1 | 15 | | | 29.0 |
| 13 | Tomadol 23-3 | 15 | | | 24.5 |
| 14 | Tomadol 23-5 | 15 | | | 27.5 |
| 15 | Tomadol 23-6.5 | 15 | | | 25.3 |
| 16 | Ethal TDA-6 | 15 | | | 26.0 |
| 17 | Ethal TDA-9 | 15 | | | 28.0 |
| 18 | Tomadol 25-3 | 15 | | | 28.0 |
| 19 | Tomadol 25-7 | 15 | | | 28.0 |
| 20 | Tomadol 25-9 | 15 | | | 27.0 |
| 21 | Tomadol 45-7 | 15 | | | 27.0 |
| 22 | Tomadol 45-13 | 15 | | | 28.5 |
| 23 | Surfadone™ LP-300 | 15 | | | 20.6 |
| 24 | Surfadone LP-100 | 15 | | | 18.4 |
| 25 | Ethal EH-2 | 3.8 | Surfadone LP-300 | 11.76 | 28.0 |
| 26 | Ethal EH-2 | 3.8 | Surfadone LP-100 | 11.76 | 25.5 |
| 27 | Ethal EH-5 | 3.8 | Surfadone LP-300 | 11.76 | 24.7 |
| 28 | Ethal EH-5 | 3.8 | Surfadone LP-100 | 11.76 | 26.8 |
| 29 | Ethal DA-4 | 3.8 | Surfadone LP-300 | 11.76 | 23.5 |
| 30 | Ethal DA-4 | 3.8 | Surfadone LP-100 | 11.76 | 24.0 |
| 31 | Ethal DA-6 | 3.8 | Surfadone LP-300 | 11.76 | 22.5 |
| 32 | Ethal DA-6 | 3.8 | Surfadone LP-100 | 11.76 | 24.5 |
| 33 | Ethal DA-9 | 3.8 | Surfadone LP-300 | 11.76 | 23.5 |
| 34 | Ethal DA-9 | 3.8 | Surfadone LP-100 | 11.76 | 20.5 |
| 35 | Tomadol 91-2.5 | 3.8 | Surfadone LP-300 | 11.76 | 25.0 |
| 36 | Tomadol 91-2.5 | 3.8 | Surfadone LP-100 | 11.76 | 23.0 |
| 37 | Tomadol 91-6 | 3.8 | Surfadone LP-300 | 11.76 | 23.5 |
| 38 | Tomadol 91-6 | 3.8 | Surfadone LP-100 | 11.76 | 23.5 |
| 39 | Tomadol 91-8 | 3.8 | Surfadone LP-300 | 11.76 | 25.0 |
| 40 | Tomadol 91-8 | 3.8 | Surfadone LP-100 | 11.76 | 20.5 |
| 41 | Tomadol 1-3 | 3.8 | Surfadone LP-300 | 11.76 | 26.5 |
| 42 | Tomadol 1-3 | 3.8 | Surfadone LP-100 | 11.76 | 24.5 |
| 43 | Tomadol 1-5 | 3.8 | Surfadone LP-300 | 11.76 | 26.0 |
| 44 | Tomadol 1-5 | 3.8 | Surfadone LP-100 | 11.76 | 23.5 |
| 45 | Tomadol 1-7 | 3.8 | Surfadone LP-300 | 11.76 | 25.0 |
| 46 | Tomadol 1-7 | 3.8 | Surfadone LP-100 | 11.76 | 24.0 |
| 47 | Tomadol 1-9 | 3.8 | Surfadone LP-300 | 11.76 | 24.0 |
| 48 | Tomadol 1-9 | 3.8 | Surfadone LP-100 | 11.76 | 23.3 |
| 49 | Tomadol 23-1 | 3.8 | Surfadone LP-300 | 11.76 | 27.5 |
| 50 | Tomadol 23-1 | 3.8 | Surfadone LP-100 | 11.76 | 29.0 |
| 51 | Tomadol 23-3 | 3.8 | Surfadone LP-300 | 11.76 | 25.0 |
| 52 | Tomadol 23-3 | 3.8 | Surfadone LP-100 | 11.76 | 25.0 |
| 53 | Tomadol 23-5 | 3.8 | Surfadone LP-300 | 11.76 | 27.0 |
| 54 | Tomadol 23-5 | 3.8 | Surfadone LP-100 | 11.76 | 24.0 |
| 55 | Tomadol 23-6.5 | 3.8 | Surfadone LP-300 | 11.76 | 23.5 |
| 56 | Tomadol 23-6.5 | 3.8 | Surfadone LP-100 | 11.76 | 25.7 |
| 57 | Ethal TDA-6 | 3.8 | Surfadone LP-300 | 11.76 | 27.0 |
| 58 | Ethal TDA-6 | 3.8 | Surfadone LP-100 | 11.76 | 25.5 |
| 59 | Ethal TDA-9 | 3.8 | Surfadone LP-300 | 11.76 | 27.0 |
| 60 | Ethal TDA-9 | 3.8 | Surfadone LP-100 | 11.76 | 25.0 |
| 61 | Tomadol 25-3 | 3.8 | Surfadone LP-300 | 11.76 | 26.3 |
| 62 | Tomadol 25-3 | 3.8 | Surfadone LP-100 | 11.76 | 24.5 |
| 63 | Tomadol 25-7 | 3.8 | Surfadone LP-300 | 11.76 | 26.5 |
| 64 | Tomadol 25-7 | 3.8 | Surfadone LP-100 | 11.76 | 23.5 |
| 65 | Tomadol 25-9 | 3.8 | Surfadone LP-300 | 11.76 | 27.0 |
| 66 | Tomadol 25-9 | 3.8 | Surfadone LP-100 | 11.76 | 23.5 |
| 67 | Tomadol 45-7 | 3.8 | Surfadone LP-300 | 11.76 | 25.0 |
| 68 | Tomadol 45-7 | 3.8 | Surfadone LP-100 | 11.76 | 27.0 |
| 69 | Tomadol 45-13 | 3.8 | Surfadone LP-300 | 11.76 | 28.0 |
| 70 | Tomadol 45-13 | 3.8 | Surfadone LP-100 | 11.76 | 28.0 |

Samples 1-70 and 71-114 (below) all were mixed with 31.5 wt % solid lignosulfonate and the remainder was warm water (180-200° F.). All samples were mixed with a lab scale Cowles disperser. Patty size was the resulting measurement of a slump test. The slump test was conducted by mixing the additive blend with 100 g water; 100 g of stucco obtained from a local gypsum wallboard manufacturing plant was added to the water/additive mixture, allowed to soak for 10 seconds and then mixed on a milkshake mixer for 15 seconds. The stucco slurry was then immediately poured into a brass pipe measuring 2 inch diameter by 2 inch tall that was positioned vertically on a piece of Plexiglas®. As soon as the pipe was filled, it was lifted and the resulting slurry patty was measured.

Varying the concentration of the wetting agents and/or surfactants can also lead to changes in performance as shown in Examples 71-94.

| Example | Surfactant | Wt % | Patty Size (cm) |
|---|---|---|---|
| 71 | Surfynol 104 | 1.0 | 26.5 |
| 72 | Surfynol 104 | 3.0 | 28.0 |
| 73 | Surfynol 104 | 4.0 | 30.0 |
| 74 | Surfynol 104 | 5.0 | 29.0 |
| 75 | Surfynol 104 | 6.0 | 29.0 |
| 76 | Surfynol 104 | 7.0 | 32.0 |
| 77 | Surfynol 104 | 7.5 | 30.5 |
| 78 | Surfynol 104 | 10.0 | 29.2 |
| 79 | Surfynol 104 | 12.0 | 29.5 |
| 80 | Surfynol 104 | 15.0 | 30.0 |
| 81 | EnviroGem AE01 | 1.0 | 26.5 |
| 82 | EnviroGem AE01 | 3.0 | 26.0 |
| 83 | EnviroGem AE01 | 5.0 | 26.5 |
| 84 | EnviroGem AE01 | 7.5 | 27.2 |
| 85 | EnviroGem AE01 | 10.0 | 28.5 |
| 86 | EnviroGem AE01 | 12.0 | 27.8 |
| 87 | EnviroGem AE01 | 15.0 | 29.0 |
| 88 | Tomadol 23-1 | 1.0 | 27.5 |
| 89 | Tomadol 23-1 | 3.0 | 27.5 |
| 90 | Tomadol 23-1 | 5.0 | 27.0 |
| 91 | Tomadol 23-1 | 7.5 | 26.5 |
| 92 | Tomadol 23-1 | 10.0 | 26.5 |
| 93 | Tomadol 23-1 | 12.0 | 27.0 |
| 94 | Tomadol 23-1 | 15.0 | 29.0 |

Adjusting the ratios of two nonionic wetting agents and/or surfactants can lead to changes in performance as shown in Examples 95-114.

| Example | Surfactant 1 | Wt % | Surfactant 2 | Wt % | Patty Size (cm) |
|---|---|---|---|---|---|
| 95 | Surfynol 104 | 1.5 | Tomadol 45-13 | 2.8 | 28.0 |
| 96 | Surfynol 104 | 1.5 | Tomadol 45-13 | 3.5 | 28.0 |
| 97 | Surfynol 104 | 2.0 | Tomadol 45-13 | 1.0 | 28.5 |
| 97 | Surfynol 104 | 3.5 | Tomadol 45-13 | 2.8 | 28.0 |
| 98 | Surfynol 104 | 3.8 | Tomadol 45-13 | 11.2 | 26.5 |
| 99 | Surfynol 104 | 4.0 | Tomadol 45-13 | 1.0 | 29.0 |
| 100 | Surfynol 104 | 5.0 | Tomadol 45-13 | 10.0 | 27.3 |
| 101 | Surfynol 104 | 6.0 | Tomadol 45-13 | 1.0 | 29.0 |
| 102 | Surfynol 104 | 7.5 | Tomadol 45-13 | 7.5 | 26.5 |
| 103 | Surfynol 104 | 8.0 | Tomadol 45-13 | 1.0 | 29.0 |
| 104 | Surfynol 104 | 10.0 | Tomadol 45-13 | 1.0 | 27.5 |
| 105 | Surfynol 104 | 10.0 | Tomadol 45-13 | 5.0 | 28.0 |
| 106 | Surfynol 104 | 11.2 | Tomadol 45-13 | 3.8 | 29.5 |
| 107 | Surfynol 104 | 12.0 | Tomadol 45-13 | 1.0 | 28.0 |
| 108 | Surfynol 104 | 14.0 | Tomadol 45-13 | 1.0 | 28.5 |
| 109 | Surfynol 104 | 2.5 | Tomadol 23-1 | 2.5 | 30.5 |
| 110 | Tomadol 23-1 | 3.8 | Tomadol 45-13 | 11.2 | 29.0 |
| 111 | Tomadol 23-1 | 5.0 | Tomadol 45-13 | 10.0 | 28.5 |
| 112 | Tomadol 23-1 | 7.5 | Tomadol 45-13 | 7.5 | 26.0 |
| 113 | Tomadol 23-1 | 10.0 | Tomadol 45-13 | 5.0 | 27.5 |
| 114 | Tomadol 23-1 | 11.2 | Tomadol 45-13 | 3.8 | 27.3 |

EXAMPLES 115-150

Additional formulations, with particular weight percents of components contained therein, are found in the following examples prepared with the same method as examples 1-114.

| Example | Additive | Wt. % | KOH, Wt. % | Patty Size (cm) |
|---|---|---|---|---|
| 115 | — | — | 0.41 | 27 |
| 116 | Silsurf A008UP | 0.5 | 0.41 | 29 |
| 117 | Silsurf A004D | 0.5 | 0.41 | 17.5 |
| 118 | Silsurf A004D | 4.6 | 0.41 | 28.3 |
| 119 | Silsurf A008UP | 4.6 | 0.41 | 28.5 |
| 120 | Silsurf A008UP | 0.5 | 0.41 | 19 |
| 121 | Silsurf A004UP | 0.5 | 0.41 | 29 |
| 122 | Silusrf Di15P | 0.5 | 0.41 | 23.5 |
| 123 | Silphos A100 | 0.5 | 0.41 | 16 |
| 124 | Silsurf Di1010 | 0.5 | 0.41 | 17.5 |
| 125 | Silquat PR1145 | 0.5 | 0.41 | 18.5 |
| 126 | Siltech C-816 | 0.4 | 0.41 | 17 |
| 127 | Silsurf J1015-O | 1.0 | | 19.8 |
| 128 | Silquat A0 | 1.0 | | 15.5 |
| 129 | Silquat A0 | 1.0 | 0.41 | 15.5 |
| 130 | Silsurf J1015-O-Ac | 1.0 | | 19 |
| 131 | Silsurf J1015-O-Ac | 1.0 | 0.41 | 21 |
| 132 | Silsurf D212-CG | 1.0 | | 18 |
| 133 | Silsurf D212-CG | 1.0 | 0.41 | 18 |
| 134 | Silsurf D208 | 1.0 | | 19 |
| 135 | Silsurf D208 | 1.0 | 0.41 | 17 |
| 136 | Silsurf J208 | 1.0 | | 19.5 |
| 137 | Silsurf J208 | 1.0 | 0.41 | 17.5 |
| 138 | Silube FF108-16 | 1.0 | | 19 |
| 139 | Silube J208-212 | 1.0 | | 17.5 |
| 140 | Fluorosil 2010 | 1.0 | | 19.5 |
| 141 | Silsurf A008UP + Lica 09 | 1.0 of each additive | 0.41 | 27.5 |
| 142 | Silsurf A008UP | 1.0 | | 28 |
| 143 | Silwet Hydrostable 611 | 1.0 | | 26 |
| 144 | Silwet WSR | 1.0 | | 17.5 |
| 145 | Silwet L7602 | 1.0 | | 21.5 |
| 146 | Silwet L8600 | 1.0 | | 18.3 |
| 147 | Silwet L7600 | 1.0 | | 21.5 |
| 148 | Silwet L7280 | 1.0 | | 29 |
| 149 | Silbyk 9215 | 1.0 | | 20.5 |
| 150 | Silmer A0 | 1.0 | | 21.5 |

*Sample 115 as control; 7.5 weight percent lignosulfonate in all samples except Sample 120.

The emulsions were formed into patties of about 15 cm in diameter and were evaluated for slurry viscosity, which was tested by pouring the slurry into a Number 4 Ford cup. The elapsed time for the slurry to empty out of the cup was recorded, as well as the resulting patty formed 12 cm under the Ford cup on a glass or Plexiglas surface. The patty was measured after the cup had completely emptied, with the larger the patty, the lower the slurry viscosity.

Further testing is found below (examples 151-358). The preparation and testing for these examples was identical to that found in examples 1-114.

| Sample | Surfactant 1 | wt % | Surfactant 2 | wt % | Surfactant 3 | wt % | Patty size (cm) |
|---|---|---|---|---|---|---|---|
| 151 | Surfadone ™ LP100 | 3.8 | Tomadol ™ 900 | 11.76 | | | 20.5 |
| 152 | Silsurf ™ A008UP | 7.5 | Polystep ™ A16 | 7.5 | | | 24.5 |
| 153 | Silsurf A008UP | 7.5 | Bio-Terge ™ PA8S | 7.5 | | | 24.5 |
| 154 | Silsurf A008UP | 7.5 | Ethacryl ™ G | 7.5 | | | 22.0 |
| 155 | Silsurf A008UP | 7.5 | Stepanate ™ AXS | 7.5 | | | 25.7 |
| 156 | Silsurf A008UP | 7.5 | Nuosperse ™ 2008 | 7.5 | | | 24.0 |
| 157 | Silsurf A008UP | 7.5 | Easy-Wet ™ 20 | 7.5 | | | 24.5 |
| 158 | Silsurf A008UP | 7.5 | Surfadone LP300 | 7.5 | | | 23.0 |
| 159 | Silsurf A008UP | 7.5 | Surfadone LP100 | 7.5 | | | 22.0 |
| 160 | Silres ™ BM SMK 2101 | 7.5 | Silsurf A008UP | 7.5 | | | 26.0 |
| 161 | Silres BM SMK 2101 | 7.5 | Polystep A16 | 7.5 | | | 26.5 |
| 162 | Silres BM SMK 2101 | 7.5 | Ethacryl G | 7.5 | | | 19.0 |
| 163 | Silres BM SMK 2101 | 7.5 | Nuosperse 2008 | 7.5 | | | 26.0 |
| 164 | Silres BM SMK 2101 | 7.5 | Easy-Wet 20 | 7.5 | | | 26.5 |
| 165 | Silres BM SMK 2101 | 7.5 | Surfadone LP300 | 7.5 | | | 24.5 |
| 166 | Silres BM SMK 2101 | 7.5 | Surfadone LP100 | 7.5 | | | 24.5 |
| 167 | Dynol ™ 604 | 15.0 | | | | | 27.5 |
| 168 | Envirogem ™ AE01 | 15.0 | | | | | 29.0 |
| 169 | Surfynol ™ 104 | 15.0 | | | | | 30.0 |
| 170 | Surfadone LP100 | 3.8 | Pluronic ™ 17R2 | 11.76 | | | 26.3 |
| 171 | Surfadone LP300 | 3.8 | Pluronic 17R2 | 11.76 | | | 24.5 |
| 172 | Silsurf A008UP | 3.8 | Pluronic 17R2 | 11.76 | | | 24.0 |
| 173 | Silres BM SMK 2101 | 3.8 | Pluronic 17R2 | 11.76 | | | 26.5 |
| 174 | Calfax ™ 10L-45 | 15.0 | | | | | 22.0 |
| 175 | Calfax DB-45 | 15.0 | | | | | 22.2 |
| 176 | Calfax 16L-35 | 15.0 | | | | | 24.5 |
| 177 | Nuosperse FX609 | 15.0 | | | | | |
| 178 | Nuosperse FA192 | 15.0 | | | | | |
| 179 | Dynol TM604 | 15.0 | | | | | 26.5 |
| 180 | Envirogem 360 | 15.0 | | | | | 27.0 |
| 181 | Surfadone LP100 | 3.8 | Tomadol ™ 23-1 | 11.76 | | | 29.0 |
| 182 | Surfadone LP100 | 3.8 | Pluronic 25R2 | 11.76 | | | |
| 183 | Surfadone LP300 | 3.8 | Pluronic L92 | 11.76 | | | 25.0 |
| 184 | Surfadone LP100 | 3.8 | Ethal ™ EH-2 | 11.76 | | | 25.5 |
| 185 | Surfadone LP100 | 3.8 | Tomadol ™ 25-7 | 11.76 | | | 23.5 |
| 186 | Surfadone LP100 | 3.8 | Ethal CO-30 | 11.76 | | | 24.5 |
| 187 | Surfadone LP100 | 3.8 | Thorcopeg ™ 200 | 11.76 | | | 26.5 |

-continued

| Sample | Surfactant 1 | wt % | Surfactant 2 | wt % | Surfactant 3 | wt % | Patty size (cm) |
|---|---|---|---|---|---|---|---|
| 188 | Surfadone LP100 | 3.8 | Thorconic ™ NP6 | 11.76 | | | 24.0 |
| 189 | Surfadone LP300 | 3.8 | Thorcowet TDA6 | 11.76 | | | 27.0 |
| 190 | Surfadone LP300 | 3.8 | Tomadol 600 | 11.76 | | | 27.5 |
| 191 | Surfadone LP300 | 3.8 | Novel ™ 1216 CO-2 | 11.76 | | | 28.0 |
| 192 | Surfadone LP300 | 3.8 | Alfonic ™ 1218-8 | 11.76 | | | 28.0 |
| 193 | Tomadol 23-1 | 15.0 | | | | | 29.0 |
| 194 | Pluronic L81 | 15.0 | | | | | 27.0 |
| 195 | Tomadol 45-13 | 15.0 | | | | | 28.5 |
| 196 | Pluronic 17R2 | 15.0 | | | | | 25.0 |
| 197 | Thorcopeg 200 | 15.0 | | | | | 20.5 |
| 198 | Alfonic 1218-8 | 15.0 | | | | | 27.5 |
| 199 | Novel 1216 CO-2 | 15.0 | | | | | 26.0 |
| 200 | Ethal EH-2 | 15.0 | | | | | 28.0 |
| 201 | Surfynol 104 | 1.0 | | | | | 27.5 |
| 202 | Surfynol 104 | 5.0 | | | | | 31.0 |
| 203 | Envirogem AE01 | 1.0 | | | | | 26.5 |
| 204 | Surfynol 104 | 5.0 | Surfadone LP300 | 1 | | | 31.0 |
| 205 | Tomadol 23-1 | 7.5 | Surfadone LP300 | 7.5 | | | 27.2 |
| 206 | Surfynol 104 | 14.0 | Surfadone LP300 | 1 | | | 31.5 |
| 207 | Tomadol 23-1 | 1.0 | | | | | 27.5 |
| 208 | Surfynol 104 | 3.0 | | | | | 29.5 |
| 209 | Surfadone LP100 | 3.8 | Thorconic NP-9 | 11.76 | | | 24.0 |
| 210 | Thorcopeg 400 | 15.0 | | | | | 24.0 |
| 211 | Thorcopeg 600 | 15.0 | | | | | 18.0 |
| 212 | Thorcopeg 400 | 7.5 | Surfadone LP300 | 7.5 | | | 24.0 |
| 213 | Surfadone LP100 | 3.8 | Thorconic NP200 | 11.76 | | | 25.0 |
| 214 | Surfadone LP100 | 3.8 | Thorcowet TDA6 | 11.76 | | | 25.5 |
| 215 | Surfadone LP100 | 3.8 | Tomadol 600 | 11.76 | | | 27.2 |
| 216 | Surfadone LP100 | 3.8 | Novel 1216 CO-2 | 11.76 | | | 23.0 |
| 217 | Surfadone LP100 | 3.8 | Alfonic 1218-8 | 11.76 | | | 23.0 |
| 218 | Tomadol 23-1 | 3.8 | Surfadone LP300 | 11.7 | | | 25.0 |
| 219 | Tomadol 23-1 | 7.8 | Surfadone LP300 | 7.7 | | | 26.5 |
| 220 | Tomadol 23-1 | 9.5 | Surfadone LP300 | 6 | | | 27.0 |
| 221 | Tomadol 23-1 | 11.7 | Surfadone LP300 | 3.8 | | | 28.0 |
| 222 | Surfynol 104 | 1.0 | Surfadone LP300 | 14 | | | 23.5 |
| 223 | Surfynol 104 | 5.0 | Surfadone LP300 | 5 | | | 27.5 |
| 224 | Surfynol 104 | 7.0 | Surfadone LP300 | 5 | | | 29.2 |
| 225 | Surfynol 104 | 10.0 | Surfadone LP300 | 5 | | | 28.5 |
| 226 | Surfynol 104 | 5.0 | Surfadone LP300 | 3 | | | 28.2 |
| 227 | Surfynol 104 | 7.0 | Surfadone LP300 | 3 | | | 29.0 |
| 228 | Surfynol 104 | 10.0 | Surfadone LP300 | 3 | | | 27.0 |
| 229 | Surfynol 104 | 12.0 | Surfadone LP300 | 3 | | | 29.8 |

-continued

| Sample | Surfactant 1 | wt % | Surfactant 2 | wt % | Surfactant 3 | wt % | Patty size (cm) |
|---|---|---|---|---|---|---|---|
| 230 | Surfynol 104 | 5.0 | Surfadone LP300 | 1 | | | 28.0 |
| 231 | Surfynol 104 | 7.0 | Surfadone LP300 | 1 | | | 29.2 |
| 232 | Surfynol 104 | 10.0 | Surfadone LP300 | 1 | | | 29.2 |
| 233 | Surfynol 104 | 12.0 | Surfadone LP300 | 1 | | | 29.2 |
| 234 | Merpol ™ HCS | 15.0 | | | | | 24.0 |
| 235 | Merpol HCS | 3.8 | Surfadone LP300 | 11.2 | | | 24.5 |
| 236 | Merpol HCS | 3.8 | Tomadol 23-1 | 11.2 | | | 27.5 |
| 237 | Merpol HCS | 3.8 | Surfynol 104 | 11.2 | | | 30.0 |
| 238 | Tomadol 45-13 | 3.8 | Surfynol 104 | 11.2 | | | 30.0 |
| 239 | Silsurf A008UP | 1.0 | Tomadol 23-1 | 14 | | | 27.5 |
| 240 | Silsurf A008UP | 1.0 | Tomadol 45-13 | 14 | | | 28.5 |
| 241 | Silsurf A008UP | 1.0 | Surfynol 104 | 14 | | | 30.0 |
| 242 | Silsurf A008UP | 1.0 | Surfadone LP300 | 14 | | | 25.5 |
| 243 | Silsurf A008UP | 3.0 | Surfadone LP300 | 12 | | | 25.0 |
| 244 | Silsurf A008UP | 5.0 | Surfadone LP300 | 10 | | | 25.0 |
| 245 | Silsurf A008UP | 7.5 | Surfadone LP300 | 7.5 | | | 22.5 |
| 246 | Silsurf A008UP | 10.0 | Surfadone LP300 | 5 | | | 24.0 |
| 247 | Silsurf A008UP | 12.0 | Surfadone LP300 | 3 | | | 23.5 |
| 248 | Siltech ™ AG-64 | 15.0 | | | | | 23.5 |
| 249 | Silwax ™ CR 5016 | 15.0 | | | | | 24.0 |
| 250 | Unithox 490 | 15.0 | | | | | 24.0 |
| 251 | Unithox ™ 420 | 15.0 | | | | | 23.0 |
| 252 | Nuosperse FN267 | 15.0 | | | | | 23.0 |
| 253 | Nuosperse FN260 | 15.0 | | | | | 24.5 |
| 254 | Colonial ™ SLS | 15.0 | | | | | 22.0 |
| 255 | Merpol HCS | 11.2 | Surfadone LP300 | 3.8 | | | 24.5 |
| 256 | Colonial SLS | 0.3 | Tomadol 23-1 | 11 | | | 26.5 |
| 257 | Ethox ™ 4375 | 15.0 | | | | | 25.0 |
| 258 | Servirox ™ OEG 59E | 15.0 | | | | | 23.0 |
| 259 | Ethal DA-4 | 15.0 | | | | | 23.5 |
| 260 | Tomadol 91-2.5 | 15.0 | | | | | 24.0 |
| 261 | Thocowet TDA 6 | 15.0 | | | | | 26.0 |
| 262 | Tomadol 25-3 | 15.0 | | | | | 28.0 |
| 263 | Tomadol 25-7 | 15.0 | | | | | 28.0 |
| 264 | Tomadol 45-7 | 15.0 | | | | | 27.0 |
| 265 | Thorconic NP6 | 15.0 | | | | | 27.0 |
| 266 | Thorconic NP20 | 15.0 | | | | | 27.0 |
| 267 | Pluronic L101 | 15.0 | | | | | 27.5 |
| 268 | Pluronic 17R4 | 15.0 | | | | | 22.5 |

-continued

| Sample | Surfactant 1 | wt % | Surfactant 2 | wt % | Surfactant 3 | wt % | Patty size (cm) |
|---|---|---|---|---|---|---|---|
| 269 | Pluronic L92 | 15.0 | | | | | 22.5 |
| 270 | Pluronic 25R2 | 15.0 | | | | | 24.0 |
| 271 | Surfynol 104 | 7.0 | | | | | 30.5 |
| 272 | Tomadol 23-1 | 4.0 | Surfadone LP300 | 1 | | | 29.0 |
| 273 | Tomadol 23-1 | 10.0 | Surfadone LP300 | 1 | | | 27.5 |
| 274 | Tomadol 23-1 | 14.0 | Surfadone LP300 | 1 | | | 28.5 |
| 275 | Tomadol 23-1 | 2.0 | Surfadone LP300 | 1 | | | 29.5 |
| 276 | Surfynol 104 | 1.5 | Tomadol 45-13 | 3.5 | | | 28.0 |
| 277 | Surfynol 104 | 3.0 | Tomadol 23-1 | 3.8 | Tomadol 45-13 | 11.2 | 25.5 |
| 278 | Surfynol 104 | 3.0 | Tomadol 23-1 | 11.2 | Tomadol 45-13 | 3.8 | 25.5 |
| 279 | Surfynol 104 | 3.0 | Tomadol 23-1 | 5 | Tomadol 45-13 | 10 | 26.0 |
| 280 | Surfynol 104 | 3.0 | Tomadol 23-1 | 10 | Tomadol 45-13 | 5 | 27.0 |
| 281 | Surfynol 104 | 3.0 | Tomadol 23-1 | 7.5 | Tomadol 45-13 | 7.5 | 25.5 |
| 282 | Surfadone LP300 | 1.0 | Tomadol 45-13 | 1 | | | 26.3 |
| 283 | Surfadone LP300 | 2.0 | Tomadol 45-13 | 1 | | | 26.3 |
| 284 | Surfadone LP300 | 4.0 | Tomadol 45-13 | 1 | | | 26.0 |
| 285 | Surfadone LP300 | 8.0 | Tomadol 45-13 | 1 | | | 25.5 |
| 286 | Surfadone LP300 | 10.0 | Tomadol 45-13 | 1 | | | 26.0 |
| 287 | Surfadone LP300 | 12.0 | Tomadol 45-13 | 1 | | | 24.5 |
| 288 | Surfadone LP300 | 14.0 | Tomadol 45-13 | 1 | | | 25.0 |
| 289 | Surfadone LP300 | 7.5 | Tomadol 45-13 | 7.5 | | | 26.5 |
| 290 | Surfadone LP300 | 1.0 | Tomadol 45-13 | 14 | | | 28.0 |
| 291 | Surfadone LP300 | 5.0 | Tomadol 45-13 | 10 | | | 27.0 |
| 292 | Surfadone LP300 | 4.0 | Tomadol 25-13 | 1 | | | 28.5 |
| 293 | Surfadone LP300 | 6.0 | Tomadol 25-13 | 1 | | | 29.0 |
| 294 | Surfadone LP300 | 8.0 | Tomadol 25-13 | 1 | | | 28.0 |
| 295 | Surfadone LP300 | 10.0 | Tomadol 25-13 | 1 | | | 27.0 |
| 296 | Surfadone LP300 | 12.0 | Tomadol 25-13 | 1 | | | 28.0 |
| 297 | Surfadone LP300 | 14.0 | Tomadol 25-13 | 1 | | | |
| 298 | Surfadone LP300 | 1.0 | Tomadol 25-13 | 4 | | | 29.0 |
| 299 | Surfadone LP300 | 1.0 | Tomadol 25-13 | 6 | | | 30.0 |
| 300 | Surfadone LP300 | 1.0 | Tomadol 25-13 | 8 | | | 28.0 |
| 301 | Surfadone LP300 | 1.0 | Tomadol 25-13 | 10 | | | 27.5 |
| 302 | Surfadone LP300 | 1.0 | Tomadol 25-13 | 12 | | | |
| 303 | Surfadone LP300 | 1.0 | Tomadol 25-13 | 14 | | | 27.0 |
| 304 | Surfadone LP300 | 2.0 | Tomadol 25-13 | 1 | | | 28.5 |
| 305 | Surfadone LP300 | 5.0 | Tomadol 25-13 | 10 | | | 28.0 |
| 306 | Surfadone LP300 | 7.5 | Tomadol 25-13 | 7.5 | | | 27.0 |

-continued

| Sample | Surfactant 1 | wt % | Surfactant 2 | wt % | Surfactant 3 | wt % | Patty size (cm) |
|---|---|---|---|---|---|---|---|
| 307 | Surfadone LP300 | 10.0 | Tomadol 25-13 | 5 | | | 29.0 |
| 308 | Surfadone LP300 | 3.8 | Tomadol 25-13 | 11.2 | | | 28.5 |
| 309 | Surfadone LP300 | 11.2 | Tomadol 25-13 | 3.8 | | | 28.0 |
| 310 | Surfadone LP300 | 4.0 | Tomadol 45-13 | 1 | | | 28.5 |
| 311 | Surfadone LP300 | 1.0 | Tomadol 45-13 | 4 | | | 27.0 |
| 312 | Surfadone LP300 | 10.0 | Tomadol 45-13 | 1 | | | 29.0 |
| 313 | Surfadone LP300 | 1.0 | Tomadol 45-13 | 10 | | | 27.0 |
| 314 | Surfadone LP300 | 1.0 | Thorconic NP1.5 | 4 | | | 26.0 |
| 315 | Surfadone LP300 | 1.0 | Thorconic NP1.5 | 10 | | | 27.0 |
| 316 | Surfadone LP300 | 1.0 | Thorconic NP1.5 | 14 | | | 26.0 |
| 317 | Metolat ™ 355 | 15.0 | | | | | 22.0 |
| 318 | Metolat 388 | 15.0 | | | | | 22.0 |
| 319 | Agnique ™ GMO-U | 15.0 | | | | | 27.0 |
| 320 | Igepal ™ CO-210 | 15.0 | | | | | 26.5 |
| 321 | Surfadone LP300 | 4.0 | Thorconic NP1.5 | 1 | | | 25.0 |
| 322 | Surfadone LP300 | 14.0 | Thorconic NP1.5 | 1 | | | 22.0 |
| 323 | Surfadone LP300 | 2.0 | Thorconic NP1.5 | 1 | | | 25.5 |
| 324 | Surfadone LP300 | 5.0 | Thorconic NP1.5 | 10 | | | 25.5 |
| 325 | Surfadone LP300 | 7.5 | Thorconic NP1.5 | 7.5 | | | 24.5 |
| 326 | Surfadone LP300 | 10.0 | Thorconic NP1.5 | 5 | | | 23.0 |
| 327 | Surfadone LP300 | 3.8 | Thorconic NP1.5 | 11.2 | | | 26.0 |
| 328 | Surfadone LP300 | 11.2 | Thorconic NP1.5 | 3.8 | | | 24.5 |
| 329 | Thorconic NP1.5 | 15.0 | | | | | 26.5 |
| 330 | Surfadone LP300 | 4.0 | Thorconic NP4 | 1 | | | 24.5 |
| 331 | Surfadone LP300 | 10.0 | Thorconic NP4 | 1 | | | |
| 332 | Surfadone LP300 | 14.0 | Thorconic NP4 | 1 | | | 24.0 |
| 333 | Surfadone LP300 | 1.0 | Thorconic NP4 | 4 | | | 26.0 |
| 334 | Surfadone LP300 | 1.0 | Thorconic NP4 | 10 | | | 26.0 |
| 335 | Surfadone LP300 | 1.0 | Thorconic NP4 | 14 | | | 25.5 |
| 336 | Surfadone LP300 | 2.0 | Thorconic NP4 | 1 | | | 27.0 |
| 337 | Surfadone LP300 | 5.0 | Thorconic NP4 | 10 | | | 25.0 |
| 338 | Surfadone LP300 | 7.5 | Thorconic NP4 | 7.5 | | | 23.5 |
| 339 | Surfadone LP300 | 10.0 | Thorconic NP4 | 5 | | | 24.5 |
| 340 | Surfadone LP300 | 3.8 | Thorconic NP4 | 11.2 | | | 24.0 |
| 341 | Surfadone LP300 | 11.2 | Thorconic NP4 | 3.8 | | | 24.5 |
| 342 | Thorconic NP4 | 15.0 | | | | | 26.5 |
| 343 | Surfadone LP300 | 4 | Surfonic L24-1 | 1 | | | 25.5 |
| 344 | Surfadone LP300 | 6 | Surfonic L24-1 | 1 | | | 24.5 |
| 345 | Surfadone LP300 | 8 | Surfonic L24-1 | 1 | | | 22.5 |

| Sample | Surfactant 1 | wt % | Surfactant 2 | wt % | Surfactant 3 | wt % | Patty size (cm) |
|---|---|---|---|---|---|---|---|
| 346 | Surfadone LP300 | 10 | Surfonic L24-1 | 1 | | | 23.5 |
| 347 | Surfadone LP300 | 12 | Surfonic L24-1 | 1 | | | 23.5 |
| 348 | Surfadone LP300 | 14 | Surfonic L24-1 | 1 | | | 23.0 |
| 349 | Surfadone LP300 | 1 | Surfonic L24-1 | 4 | | | 25.0 |
| 350 | Surfadone LP300 | 1 | Surfonic L24-1 | 6 | | | 23.0 |
| 351 | Surfadone LP300 | 1 | Surfonic L24-1 | 8 | | | 22.0 |
| 352 | Surfadone LP300 | 1 | Surfonic L24-1 | 10 | | | 21.0 |
| 353 | Surfadone LP300 | 2 | Surfonic L24-1 | 1 | | | 26.5 |
| 354 | Surfadone LP300 | 5 | Surfonic L24-1 | 10 | | | 25.0 |
| 355 | Surfadone LP300 | 7.5 | Surfonic L24-1 | 7.5 | | | 24.0 |
| 356 | Surfadone LP300 | 10 | Surfonic L24-1 | 5 | | | 25.0 |
| 357 | Surfadone LP300 | 3.8 | Surfonic L24-1 | 11.2 | | | 24.5 |
| 358 | Surfadone LP300 | 11.2 | Surfonic L24-1 | 3.8 | | | 24.5 |

A variety of wax formulations (examples 359-372) were prepared for evaluating wax formulations including the wetting agents and/or surfactants herein. The wax emulsions were prepared by mixing water, a dispersant, potassium hydroxide, and polyvinyl alcohol over a hot plate using an overhead mixer until the polyvinyl alcohol was melted and well dispersed (about 15 minutes with a hot plate set at 135° C. to 145° C.). In a separate container, paraffin and montan wax were melted over a hot plate until both were completely melted. After both the water mixture and the wax mixture were ready, the water mixture was placed into a mixing bowl and a mill was started. After the mill was up to full speed, the hot wax blend was added slowly. The resulting combined components were mixed at high speed for 60 seconds. At the end of 60 seconds, the liquid was transferred to a chilled metal vessel, which was immediately placed in an ice bath while mixing at low speed with an overhead mixer until the resulting emulsion was at room temperature. Samples 359-369 contained 0.41 wt % KOH, 2.36 wt % PVOH, 33.3 wt % paraffin wax, 2.1 wt % montan wax and the additive blend, and the remainder was hot water (180-200° F.) unless otherwise noted. Slumps were tested in the same fashion as examples 1-114 and examples 156-342, except 100 g water, 100 g of stucco and 2.2 g of the wax emulsion (samples 359-369) were used to make the slumps.

| Sample | Surfactant 1 | Wt % | Surfactant 2 | Wt % | Surfactant 3 | Wt % | Slump (cm) |
|---|---|---|---|---|---|---|---|
| 359 | None | | | | | | 22.5 |
| 360 | Silsurf A008UP | 0.74 | Polyfon ™ H (s) | 1.48 | Diloflo ™ 987 | 3.7 | 26.0 |
| 361 | Silsurf A008UP | 2.48 | Polyfon H (s) | 0.98 | | | 24.5 |
| 362 | Silsurf A008UP | 0.74 | Polyfon H (s) | 0.74 | Diloflo 987 | 5.55 | 26.5 |
| 363 | Silsurf A008UP | 0.148 | Polyfon H (s) | 0.82 | Diloflo 987 | 5.55 | 27.0 |
| 364 | Polyfon H (lq) | 1.2 | Diloflo 987 | 6.0 | | | 25.5 |
| 365 | Silsurf A008UP | 0.2 | Polyfon H (lq) | 1.2 | Diloflo 987 | 6.0 | 26.5 |
| 366 | Silsurf A008UP | 0.3 | Polyfon H (lq) | 1.2 | Diloflo 987 | 6.0 | 27.0 |
| 367 | Silsurf A008UP | 0.3 | Diloflo 987 | 4.91 | | | 26.5 |
| 368 | Surfynol 104 | 0.06 | Polyfon H (lq) | 2.24 | | | 26.5 |
| 369* | Surfadone LP300 | 0.14 | Tomadol 23-1 | 0.47 | Polyfon H (lq) | 0.22 | 27.5 |
| 370** | Silsurf A008UP | 0.44 | Polyfon H (lq) | 1.76 | Diloflo 987 | 8.79 | 18.5 |

-continued

| Sample | Surfactant 1 | Wt % | Surfactant 2 | Wt % | Surfactant 3 | Wt % | Slump (cm) |
|---|---|---|---|---|---|---|---|
| 371** | Surfadone LP300 | 0.35 | Tomadol 23-1 | 1.18 | Polyfon H (lq) | 0.55 | 18.5 |
| 372*** | None | | | | | | 19.0 |

*Sample 369 also contained 3.54 wt % Diloflo GS-20.
**Samples 370-371 were blended with Silres BS94 which is a standard siloxane used to create water resistant gypsum wallboard and sample 371 used 8.90 wt % Diloflo GS-20.
***Sample 372 is just Silres BS94 at 7-g in 100 g stucco with 100 g water.

While some samples performed somewhat better in terms of water absorption, based on varied component amounts, generally it can be seen that the additives tested provided properties that were comparable, and in many cases better than the control having the comparable wax base component composition, particularly as the water content of the wallboard was decreased. In addition to providing the potential for good water absorption for manufacturing water-resistant gypsum wallboard, the inventive formulations assist in reducing slurry viscosity (increasing patty size) to minimize use of water and help reduce energy use by requiring less energy for drying. This results in overall energy efficiency improvements and cost savings to the manufacturers making water resistant gypsum products.

Not to be bound to a single theory, it is anticipated that to efficiently modify stucco slurry rheology in a gypsum wallboard manufacturing process, an additive blend should contain components that not only provide wetting for the system components, but act in a synergistic fashion with the dispersant(s) to ensure that the gypsum and other additives or components of the wallboard formula are properly and efficiently dispersed in the mixture; i.e., the ability of some wetting agents and/or surfactants to sterically interact with the dispersing agent results in facilitating the stable suspension of the gypsum mixture. In support of this hypothesis, some components such as the ethoxylated alcohols also appear to have a dependence on carbon chain length, with C8-C18 chain lengths performing well depending on the degree of ethoxylation.

Use of the HLB system to differentiate wetting agent and/or surfactant performance does not apply to dispersing gypsum. Surfactants with HLB values ranging between about 3 and 16 can be effective.

A low viscosity additive blend also appears to be beneficial to efficient wetting in the system. As those who are familiar with the art of manufacturing gypsum based construction products would appreciate, any additive blend that is introduced to the wallboard manufacturing process should be compatible with all of the components in that system. For example, any new additives introduced to the system should not include defoamers, otherwise the gypsum wallboard density will be adversely affected and failures such as blisters and blows may form during the manufacturing process. However, some additive blends of wetting agents and/or surfactants may slightly coalesce the foaming system used in the gypsum wallboard manufacturing process, resulting in larger bubbles than expected. This increased "activity" of the foaming system may result in higher mechanical properties of the formed gypsum system. It is interesting to note that when using some wetting agents and/or surfactants that are primarily used to decrease the slurry viscosity, some blends can advantageously modify the foam structure, other blends do not impact the foam structure in any manner, and many blends of wetting agents and/or surfactants modify the foam structure in a negative fashion. Thus, care needs to be taken to utilize additive blends that provide slurry viscosity benefits without adversely affecting foam structure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for making a gypsum wallboard, wherein the method comprises:
    preparing a gypsum slurry;
    adding a mixture to the gypsum slurry, wherein the mixture comprises:
        about 10 weight percent to about 80 weight percent water; and a composition comprising (a) about 5 weight percent to about 80 percent by weight of a dispersant selected from the group consisting of lignosulfonic acid, naphthalene sulfonic acid, and combinations and salts thereof, and (b) about 1 weight percent to about 25 percent by weight of a wetting agent and/or a surfactant with an HLB of from about 3 to 16,
    wherein a ratio of the wetting agent and/or the surfactant to the dispersant in the mixture is about 0.13:1 to about 10:1
    wherein a stable suspension of gypsum is facilitated and wherein a weight ratio of a combined weight of the wetting agent and/or the surfactant to a weight of gypsum in the gypsum slurry is about 0.001:100 to about 10.0:100;
    forming the gypsum slurry into a structure for a gypsum wallboard; and
    drying the structure to form the gypsum wallboard.

2. The method of claim 1, wherein the gypsum wallboard is water-resistant.

3. The method of claim 2, wherein the mixture further comprises at least one wax or siloxane.

4. The method of claim 1, wherein forming the structure comprises placing the gypsum slurry between two liners to form the structure.

5. The method of claim 3, wherein the at least one wax is a blend of paraffin wax with montan wax.

6. The method of claim 1, wherein the mixture further comprises a paraffinic hydrocarbon.

7. The method of claim 1, wherein the mixture further comprises at least one stabilizer.

8. The method of claim 7, wherein the at least one stabilizer comprises polyvinyl alcohol.

9. The method of claim 8, wherein the polyvinyl alcohol is about 97% to about 100% hydrolyzed polyvinyl alcohol.

10. The method of claim 1, wherein the mixture further comprises a saponifying agent.

11. The method of claim 10, wherein the saponifying agent is an alkali metal hydroxide.

12. The method of claim 11, wherein the alkali metal hydroxide is potassium hydroxide.

13. The method of claim 1, wherein the wetting agent and/or the surfactant is selected from the group consisting of fatty alcohols, ethoxylated alcohols, vegetable oil ethoxylates, alkyl phenol ethoxylates, monobasic esters, silicone polyethers, alkylated pyrrolidone-based compounds, asphaltene dispersants, acetylenic diols, EO/PO block copolymers, polyethylene glycols, polyethylene glycol (PEG) esters, alkylbenzenesulfonic acids, alkylbenzene sulfonate, sodium, potassium and amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

14. The method of claim 1, wherein the mixture comprises a blend of naphthalene sulfonate, lignosulfonate, dodecyl vinyl pyrrolidone, and ethoxylated alcohol.

15. A method for reducing energy use in the manufacture of a building product, wherein the building product is gypsum wallboard, comprising,
providing to a formulation for forming the building product, prior to a drying step for drying the formulation, a mixture comprising:
about 10 weight percent to about 80 weight percent water; and a composition comprising (a) about 5 weight percent to about 80 percent by weight of a dispersant selected from the group consisting of lignosulfonic acid, naphthalene sulfonic acid, and combinations and salts thereof, and (b) about 1 weight percent to about 25 percent by weight of a wetting agent and/or a surfactant with an HLB of from about 3 to 16,
wherein a ratio of the wetting agent and/or the surfactant to the dispersant in the mixture is about 0.13:1 to about 10:1, and
wherein a stable suspension of gypsum is facilitated and wherein a weight ratio of a combined weight of the wetting agent and/or the gypsum in the gypsum slurry is about 0.001:100 to about 10.0:100.

16. The method of claim 15, wherein the gypsum wallboard is water-resistant.

17. The method of claim 16, wherein the mixture further comprises at least one wax or siloxane.

18. The method of claim 15, wherein forming a structure comprises placing a gypsum slurry between two liners to form the structure.

19. The method of claim 17, wherein the at least one wax is a blend of paraffin wax with montan wax.

20. The method of claim 15, wherein the mixture further comprises a paraffinic hydrocarbon.

21. The method of claim 15, wherein the mixture further comprises at least one stabilizer.

22. The method of claim 21, wherein the at least one stabilizer comprises polyvinyl alcohol.

23. The method of claim 22, wherein the polyvinyl alcohol is about 97% to about 100% hydrolyzed polyvinyl alcohol.

24. The method of claim 15, wherein the mixture further comprises a saponifying agent.

25. The method of claim 24, wherein the saponifying agent is an alkali metal hydroxide.

26. The method of claim 25, wherein the alkali metal hydroxide is potassium hydroxide.

27. The method of claim 15, wherein the wetting agent and/or the surfactant is selected from the group consisting of fatty alcohols, ethoxylated alcohols, vegetable oil ethoxylates, alkyl phenol ethoxylates, monobasic esters, silicone polyethers, alkylated pyrrolidone-based compounds, asphaltene dispersants, acetylenic diols, EO/PO block copolymers, polyethylene glycols, polyethylene glycol (PEG) esters, alkylbenzenesulfonic acids, alkylbenzene sulfonate, sodium, potassium and amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

28. The method of claim 15, wherein the mixture comprises a blend of naphthalene sulfonate, lignosulfonate, dodecyl vinyl pyrrolidone, and ethoxylated alcohol.

29. A settable gypsum composition suitable for forming a gypsum product comprising:
a gypsum slurry; and a mixture comprising:
about 10 weight percent to about 80 weight percent water; and composition comprising (a) about 5 weight percent to about 80 percent by weight of a dispersant selected from the group consisting of lignosulfonic acid, naphthalene sulfonic acid and combinations and salts thereof, and (b) about 1 weight percent to about 25 percent by weight of a wetting agent and/or a surfactant with an HLB of from about 3 to 16,
wherein a ratio of the wetting agent and/or the surfactant to the gypsum in the slurry is about 0.001:100 to about 10.0:100 by weight, and
wherein a stable suspension of gypsum is facilitated.

30. The composition of claim 29, wherein the gypsum product is water-resistant.

31. The composition of claim 30, wherein the mixture further comprises at least one wax or siloxane.

32. The composition of claim 31, wherein the at least one wax is a blend of paraffin wax with montan wax.

33. The composition of claim 29, wherein the mixture further comprises a paraffinic hydrocarbon.

34. The composition of claim 29, wherein the mixture further comprises at least one stabilizer.

35. The composition of claim 34, wherein the at least one stabilizer comprises polyvinyl alcohol.

36. The composition of claim 35, wherein the polyvinyl alcohol is about 97% to about 100% hydrolyzed polyvinyl alcohol.

37. The composition of claim 29, wherein the mixture further comprises a saponifying agent.

38. The composition of claim 37, wherein the saponifying agent is an alkali metal hydroxide.

39. The composition of claim 38, wherein the alkali metal hydroxide is potassium hydroxide.

40. The composition of claim 29, wherein the wetting agent and/or the surfactant is selected from the group consisting of fatty alcohols, ethoxylated alcohols, vegetable oil ethoxylates, alkyl phenol ethoxylates, monobasic esters, silicone polyethers, alkylated pyrrolidone-based compounds, asphaltene dispersants, acetylenic diols, EO/PO block copolymers, polyethylene glycols, polyethylene glycol (PEG) esters, alkylbenzenesulfonic acids, alkylbenzene sulfonate, sodium, potassium and amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

41. The composition of claim 29, wherein the mixture comprises a blend of naphthalene sulfonate, lignosulfonate, dodecyl vinyl pyrrolidone, and ethoxylated alcohol.

42. The method of claim 1, wherein the mixture is added directly to the gypsum and the ratio of the (b) wetting agent and/or the surfactant to the (a) dispersant is about 0.13:1 to about 5:1.

43. The method of claim 1, wherein the mixture is incorporated in a wax emulsion and the ratio of the (b) wetting agent and/or the surfactant to the (a) dispersant is about 0.02:1 to about 10:1.

44. The method of claim 15, wherein the mixture is added directly to the gypsum and the ratio of the (b) wetting agent and/or the surfactant to the (a) dispersant is about 0.13:1 to about 5:1.

45. The method of claim 15, wherein the mixture is incorporated in a wax emulsion and the ratio of the (b) wetting agent and/or the surfactant to the (a) dispersant is about 0.02:1 to about 10:1.

46. The composition of claim 29, wherein the mixture is added directly to the gypsum and the ratio of the (b) wetting agent and/or the surfactant to the (a) dispersant is about 0.13:1 to about 5:1.

47. The composition of claim 29, wherein the mixture is incorporated in a wax emulsion and the ratio of the (b) wetting agent and/or the surfactant to the (a) dispersant is about 0.02:1 to about 10:1.

48. The composition according to claim 1, wherein the composition is wax-free.

49. The composition according to claim 1, wherein the weight ratio of the combined weight of the dispersant and the wetting agent and/or the surfactant to the weight of gypsum in the gypsum slurry is about 0.01:100 to about 2.0:100.

50. The composition according to claim 15, wherein the composition is wax-free.

51. The composition according to claim 15, wherein the weight ratio of the combined weight of the dispersant and the wetting agent and/or the surfactant to the weight of gypsum in the gypsum slurry is about 0.01:100 to about 2.0:100.

52. The composition according to claim 29, wherein the composition is wax-free.

53. The composition according to claim 29, wherein the weight ratio of the combined weight of the dispersant and the wetting agent and/or the surfactant to the weight of gypsum in the gypsum slurry is about 0.01:100 to about 2.0:100.

54. A method for reducing energy use from drying gypsum wallboard in the manufacture of a building product, wherein the building product is gypsum wallboard, comprising,
  providing to a wax-free formulation for forming the building product, prior to a drying step for drying the formulation,
  a composition comprising a dispersant selected from the group consisting of lignosulfonic acid, naphthalene sulfonic acid, and combinations and salts thereof, and (b) a wetting agent and/or a surfactant with an HLB of from about 3 to 16,
  wherein a ratio of the wetting agent and/or the surfactant to the dispersant in the mixture is about 0.13:1 to about 10:1, and
  wherein a stable suspension of gypsum is facilitated with minimal foam generation,
  wherein a weight ratio of a combined weight of the wetting agent and/or the surfactant to a weight of gypsum in the gypsum slurry is about 0.001:100 to about 10.0:100.

\* \* \* \* \*